March 26, 1974  M. H. ARNAO ET AL  3,799,824
METHOD OF MAKING POWER TRANSMISSION BELTS
Filed Dec. 23, 1971  3 Sheets-Sheet 1
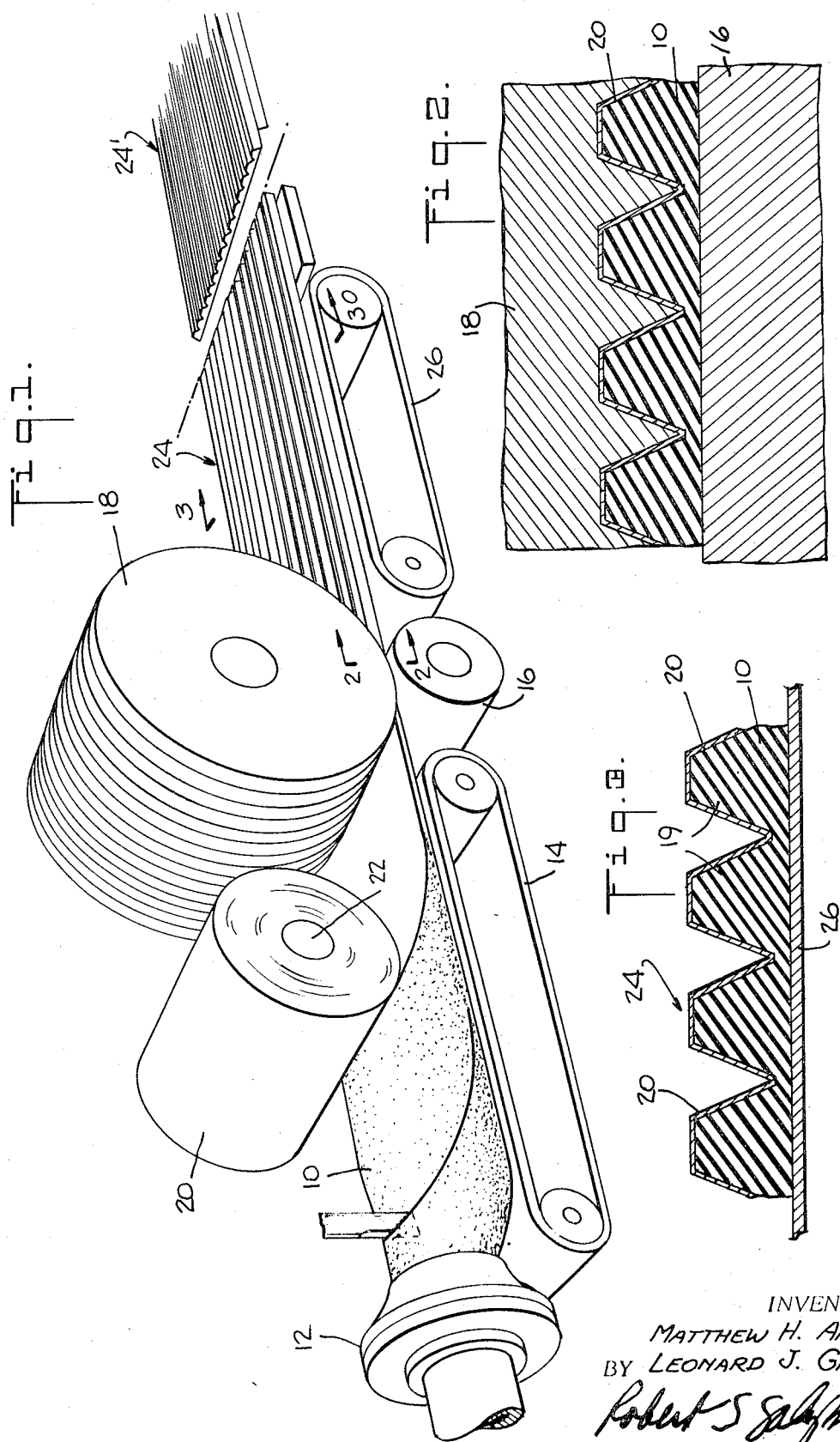
INVENTORS
MATTHEW H. ARNAO
BY LEONARD J. GRECCO
Robert S Salzman
ATTORNEY

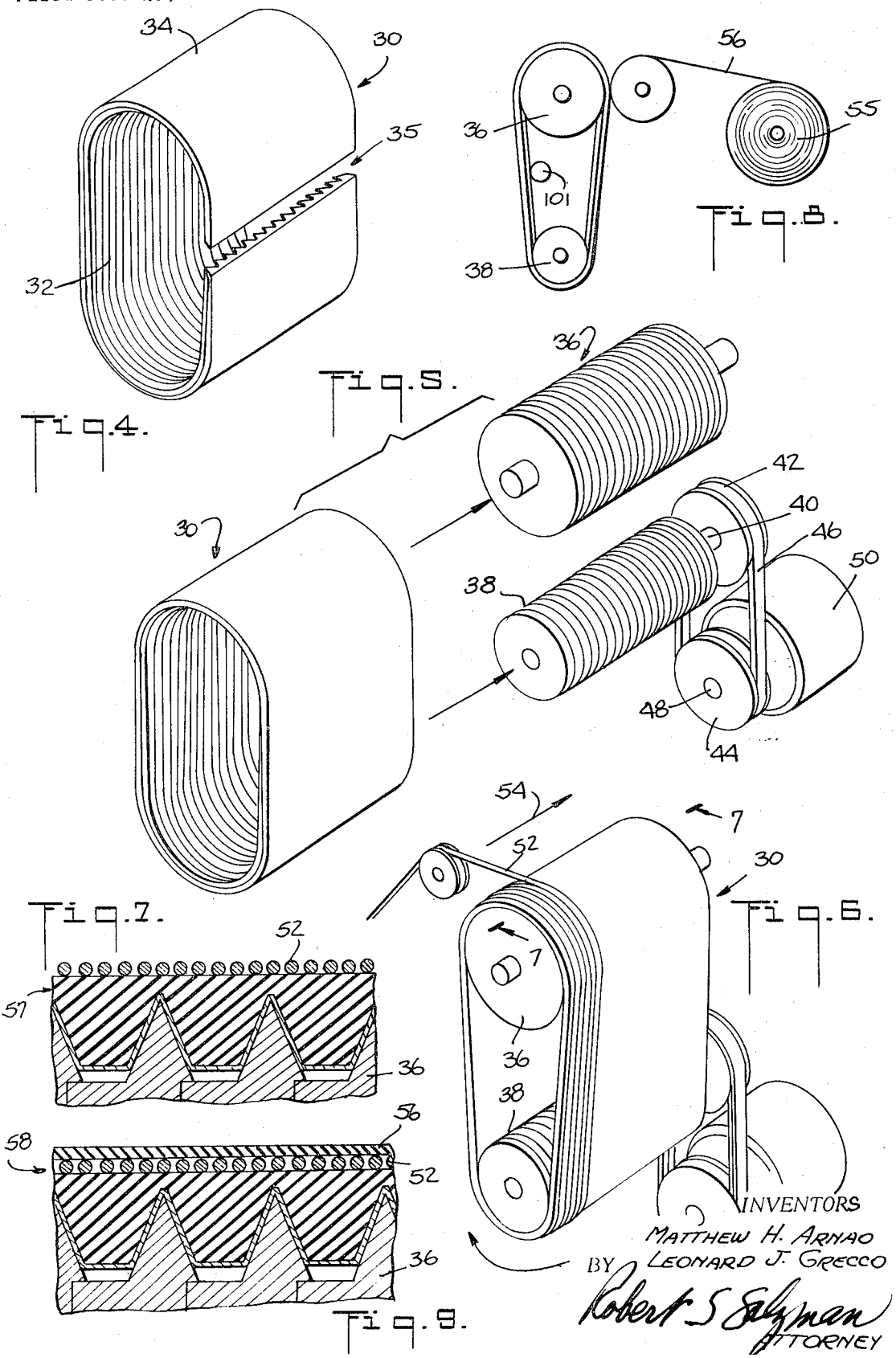

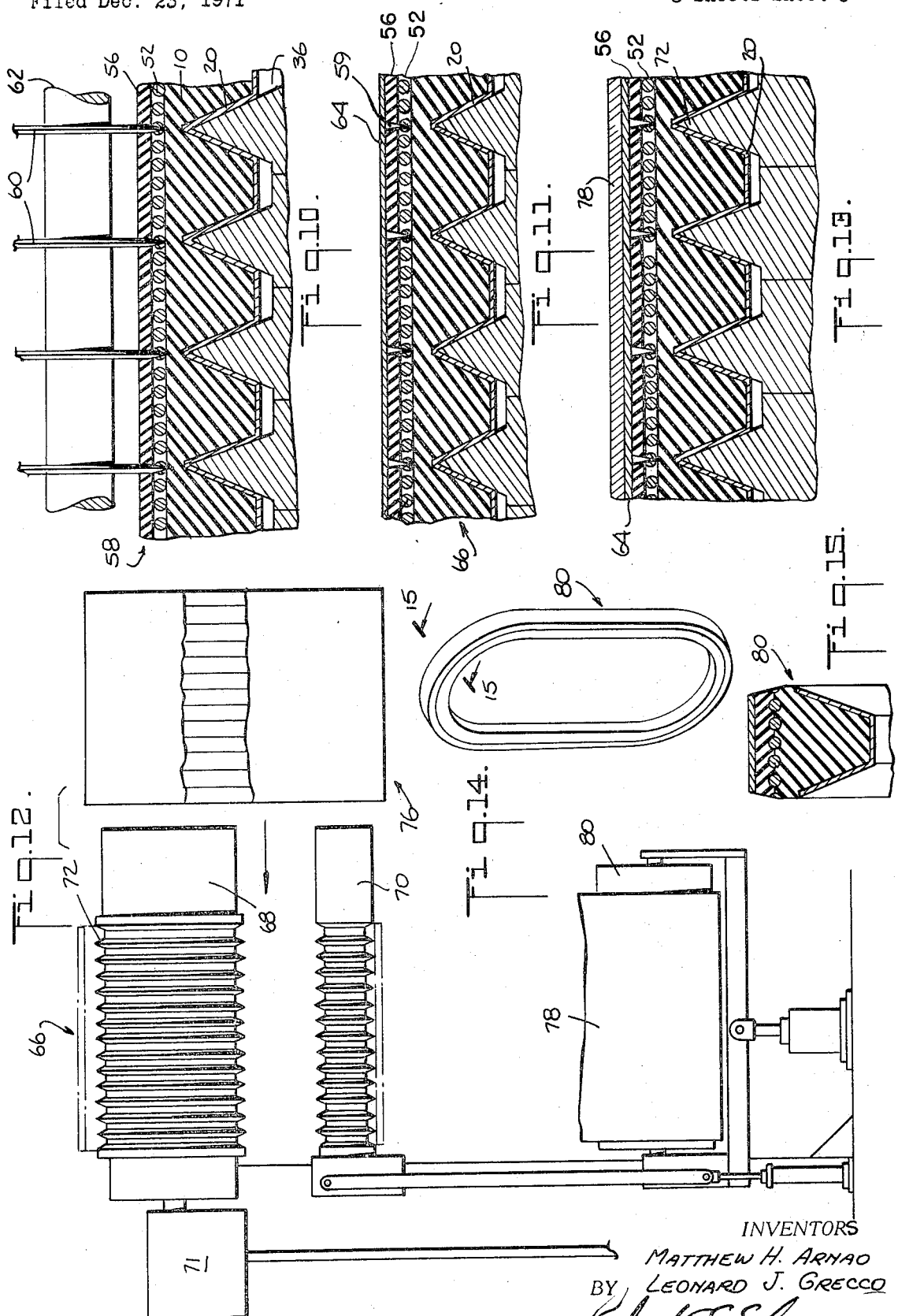

United States Patent Office 3,799,824
Patented Mar. 26, 1974

3,799,824
METHOD OF MAKING POWER
TRANSMISSION BELTS
Matthew H. Arnao, Huntingdon Valley, Pa., and Leonard J. Grecco, Pennsauken, N.J., assignors to Uniroyal, Inc., New York, N.Y.
Filed Dec. 23, 1971, Ser. No. 211,174
Int. Cl. B29h 7/22
U.S. Cl. 156—139                      3 Claims

ABSTRACT OF THE DISCLOSURE

An extruded or calendered sheet of vulcanizable rubber is treated by passing it between the nip of a smooth roller and a circumferentially grooved roller with a fabric being fed to the sheet on the grooved roller side in order to impart to the rubber sheet and the fabric a series of continuous closely spaced longitudinally-extending ribs. The formed sheet is then cut transversely into desired belt circumference lengths and the cut ends are brought together to form a continuous band-like belt carcass with the ribbed surface facing inwardly. The carcass is positioned over tensioning rollers each of which has accommodating grooves for the ribs and the spacings there between, and the carcass is tensioned while a reinforcing cord of low extensibility is wrapped around the carcass preferably, but not necessarily, as a continuous helical spiral winding. A layer of a fabric coated with vulcanizable rubber stock is applied over the tension cord members on the exterior or non-grooved side, and the resulting assembly is cut along longitudinally spaced lines located between the ribs and extending inwardly into the rubber underlying the tension members, but leaving a rubber and/or fabric layer connecting the ribs together. An additional fabric layer is applied over the previously cut fabric in order to facilitate the transfer of the band-like carcass off the tension rollers. The resultant carcass with the outer fabric is subjected to pressure-forming and curing and then severed to form individual belts.

BACKGROUND OF THE INVENTION

Field of the invention

This invention relates in general to the manufacture of belting and, in particular, to a new and useful method for forming belts by simultaneously forming a plurality of such belts arranged side-by-side as an interconnected band-like carcass.

Description of the prior art

The present invention is an improvement over the prior art particularly in respect to the fact that the method can be carried out to make or to build more than one belt at a time and the further fact that a preformed belt slab is first manufactured which is composed of a rubber sheet layer, reinforcing cords, and an outer jacket in which the side of the slab is provided with trapezoidal cross-sectional longitudinally running ribs. While it is known to treat a whole slab of material in order to form them into individual belts, for example, as outlined in patents to H. C. Sauer; U.S. Pat. No. 3,477,895, issued Nov. 11, 1969, and U.S. Pat. No. 3,565,984, issued Feb. 23, 1971, assigned to Uniroyal, Inc., the present invention is an improvement over the teaching of this patent particularly in respect to the formation of the ribs by the use of circumferentially grooved rollers and by the use of a cover fabric sheet which is fed between the grooved roller and the rubber sheet during the forming process to form a composite sheet. A slab formed in this manner and cut to the length of the desired belt circumference is formed into a band-like loop with the ends joined together and the ribbed surfaces on the interior. This loop or carcass is then placed over a pair of tension rollers which have grooves for holding the ribs and the entire carcass in position thereon is moved longitudinally while a tension member, such as a continuous reinforcing cord, is wound around the circumference of the carcass.

A further feature of the method of the invention is that after the carcass is built up on the tension rollers, a layer of fabric is applied over the cord, and the cord and fabric layers are slit along parallel lines aligned opposite the apices of the grooves of the ribs. Thereafter, the carcass is transferred, after it is preferably joined to a backing fabric sheet, onto a separate pair of tension rollers on which the material of the belt is cured and thereupon the individual belt elements are cut apart. With the invention, it is possible to operate with a plurality of belts in the form of a band-like carcass which is transferred throughout the remaining portion of the process as a unit to facilitate the windling of the tension members thereon, and the applying of the fabric over the tension members, and thereafter, the subsequent final forming of the grooves and the separation of the individual belts from the carcass in the curing stage. A belt formed in accordance with the process may be a conventional V-belt, a so-called Timing ® Belt, a flat transmission belt, or a variable speed belt. By selecting the proper material and ribbed roll configuration, toothed belts can be made e.g., by using a forming roll having transverse ribs in addition to, and positioned in, the circumferential grooves.

The Dunlop Company Limited British application 6,661/69, filed Feb. 7, 1969; German Offenlegungsschrift No. 2,005,505, published Sept. 24, 1970; and South African Pat. 70/22,412, disclosed a method of making positive drive toothed belts by passing a sheet of uncured rubber and a sheet of fabric which is stretchable in the weft direction only through the nip of a plain pressure roll and a forming roll having circumferential grooves with the required belt tooth profile thereby forming a longitudinally ribbed sheet in which the ribs are filled with uncured rubber and a thin film of such rubber covers the fabric between the ribs. This composite sheet is then cut into strips of appropriate width. These strips are then fitted around a cylindrical toothed forming mold having grooves on its outer surface parallel to the axis of the mold to receive the ribs. A tension layer of cord is then wound spirally around the outer surface of the composite sheet. Rubber cement is applied to the cords and exposed surfaces and allowed to dry. The cords between individual belt sections are then removed after which the assembly is covered with a layer of unvulcanized rubber stock. Thereupon the assembly is vulcanized. The assembly is then removed from the mold and divided into individual belts by cutting through the spaces between the belts.

The present invention differs materially from the disclosure just referred to. Thus, in the present invention the cut ends of the composite sheet are brought together to form a continous band-like carcass. This belt carcass comprises a plurality of integral side-by-side belts. Cutting the cured and formed composite carcass produces a plurality of individual belts. With the invention a great many belts can be made in one operation. The invention does not require use af a cylindrical mold, but is most readily practiced using grooved rolls designated hereinafter as rolls 36 and 38 which can be tensioned and used in applying the tension cord and an intermediate fabric layer to the carcass. In its preferred form, the carcass is held together for ready handling, during transfer to, and in, the pressure-forming and curing step by the uncut tooth-covering fabric, the groove section rubber where applicable, and the outermost fabric which was applied following the cutting of the tension cord and intermediate fabric layer along spaced lines adjacent the ribs. Another difference of the present invention from that of the Dunlop Company disclosure, is that in the present invention the carcass is cut along spaced lines through the intermediary fabric and through the tension winding into, but not through, the underlying rubber and/or tooth covering fabric. Afterward a second backing fabric is applied on the non-ribbed surface of the carcass to expedite the transfer and curing steps.

The invention thus provides a simple but novel method for simultaneously forming a plurality of belts.

BRIEF DESCRIPTION OF THE DRAWINGS

In the drawings:

FIG. 1 is a top perspective view of the apparatus for forming a continuous composite sheet of rubber material into a sheet with longitudinally extending ribs in accordance with the method of the invention;

FIG. 2 is a section taken along the line 2—2 of FIG. 1;

FIG. 3 is a section taken along the line 3—3 of FIG. 1;

FIG. 4 is a front perspective view of the formation of the ribbed sheet into a continuous band-like carcass. For clarity, the carcass is shown as partly cut away adjacent the splice;

FIG. 5 is a perspective view indicating the placing of the carcass on the tension rollers;

FIG. 6 is a perspective view showing the tension elements being applied to the carcass;

FIG. 7 is a section taken along the line 7—7 of FIG. 6 showing the construction after the tension cords are applied;

FIG. 8 is a side elevational view indicating the application of a fabric to the carcass after the tension elements have been applied;

FIG. 9 is a section showing the carcass with the tension elements and the intermediary fabric thereon;

FIG. 10 is a sectional view similar to FIG. 9 showing the cutting of the carcass;

FIG. 11 shows the cut carcass in section;

FIG. 12 is an end elevational view of the curing apparatus and belt forming device;

FIG. 13 shows a sectional view of the carcass being severed into individual belt elements by the apparatus shown in FIG. 12;

FIG. 14 is a perspective view of a finished single belt which is removed from the device shown in FIG. 12; and FIG. 15 is a section taken along the line 15—15 of FIG. 14.

GENERAL DESCRIPTION OF THE PREFERRED EMBODIMENT

Referring to the drawings in particular, the method of the invention is carried out first by the use of the appartus indicated in FIG. 1, in which a continuous sheet 10 of a vulcanizable or cross-linkable rubber material is formed, for example, by extruding it from an extruder 12. Although the invention will be described in relation to V-belts, this is only by way of example, as other belts may also be made in this fashion. The sheet 10 may, of course, be formed by being calendered instead of being extruded, and it is fed along a conveyor schematically indicated at 14 into the nip defined between a lower smooth roller 16 and an upper roller 18 which is provided with a plurality of circumferentially extending grooves across its width. The sheet 10 may be initially formed as a flat smooth sheet or as one which has an upper surface which is already ribbed. The action of the rollers 16 and 18 on the sheet 10 is such as to impart, or to more clearly define, the top surface, which is adjacent to the roller 18, with a series of continuous closely spaced longitudinally extending ribs 19 of trapezoidal shape.

In this first method step, it is preferable to also feed a fabric material 20 from a continuous roll supply 22 over the surface of the sheet 10 which is adjacent the grooved roller 18 so that the cover fabric 20 is also imparted with the series of continuous closely spaced longitudinally extending ribs and defines the border material on one side for the composite structure. The fabric or cover jacket 20 has a high extensibility in warp and fill directions so that the fabric is caused to conform to, and be in full contact with, the formed rib surface of the ribbed sheet 24 which exits from the nip of the two rollers 16 and 18 and is fed away on the conveyor 26. The ribbed composite sheet 24 is then cut into individual lengths 24' which correspond in length to the circumferential length of the belts to be formed.

After the ribbed sheet 24' is formed to a length equal to the belt circumference to be fabricated, the cut ends of the sheet are brought together as shown in FIG. 4 to form a continuous belt carcass, generally designated 30, in which the ribbed surface 32 faces inwardly and the smooth surface 34 is arranged on the exterior. For clarity, reference numeral 35 denotes a gap adjacent the actual splice in the continuous carcass 30. As shown in FIG. 5, the band-like carcass 30 is placed over a pair of cooperating rolls, tension rolls 36 and 38, which are spaced apart and which each include matching circumferential grooves corresponding to the ribs 19 formed on the belt loop 30, and also corresponding to those in the first grooved roller 18 of FIG. 1. The grooves are deeper on rolls 36 and 38 than on roll 18. The roll 38 is carried on a shaft 40 with a pulley 42 which is driven from a pulley 44 by means of a belt 46. The pulley 44 is carried on a shaft 48 which is rotated by a drive motor 50.

After the carcass 30 is positioned on the rollers 36 and 38, the rollers are moved apart so that the carcass 30 is lightly tensioned. The motor 50 is started to drive the belt carcass, as shown in FIG. 6, while a continuous winding of a reinforcing cord or strand 52 of material, such as rubber-coated reinforcing cord of a material such as glass, rayon or polyester cord is applied. The cord is advantageously wound on the exterior surface of the loop 30, preferably as a continuous helically wound layer applied from one end of the carcass to the other, proceeding in the direction indicated by the arrow 54. Optionally, multiple cord winding units can be used, each unit applying a cord over only a portion of the full width of the carcass.

At this same station, as indicated in FIG. 8, a layer of a backing material or backing fabric 56 is applied from a continuous roll supply 55 onto an assembly including the reinforcing cords, as shown in FIG. 7, and generally designated 57, in order to form it subsequently into the assembly, generally designated 58, as shown in FIG. 9. The backing fabric 56 is advantageously coated on both sides by a friction coating process with a vulcanizable rubber cover. A second inner (on rib side) jacket fabric can be applied (precut to length and rolled onto a smooth roll) as shown at 101 in FIG. 8.

The assembly 58, while still on the equipment shown in FIGS. 6 and 8, is slit (FIG. 10) at locations overlying the apices of the V's between the ribs by rotating slitter blades 60 carried on a shaft 62, and which are oriented to cut completely through the outer fabric layer 56, the reinforcing cords 52, and slightly into, or completely through, the rubber material of the sheet 10 in order to form separation slits 59 in the loop assembly, generally designated 58. Rolls 36 and 38 are preferably of the "telescoping" type as shown in FIGS. 10–14, and described in column 3, lines 42–56 of Uniroyal Pat. No. 3,565,984; issued to H. C. Sauer on February 23, 1971. These rolls are "pushed" together during the slitting step. After slitting, the "telescoping" rolls are opened (pulled out) which allows the slit loop to "drop" into the grooves to touch the bottom of the grooves. Actually, the slit carcass does not become seated until fabric 64 is wound onto the carcass surface. The dimensions of the grooves after opening correspond to the groove dimensions on rolls 68 and 70 (in FIG. 12). This "drop" or seating places the mid plane of the reinforcing cords just at the plane of the tops of the ribs on the rolls 36 and 38. To the top of the assembly 58 is then applied a cover fabric or second layer 64. This fabric 64 may be of a material similar to the fabric 56. The assembly thus formed, generally designated 66 (FIG. 11) is then transported as a loop into position over grooved rollers 68 and 70 which have circumferential grooves around the surfaces thereof at laterally spaced locations which are interrupted by projection members or walls 72 which extend to the tops of the V's as indicated in FIG. 13 during the curing process.

The rolls 68 and 70 are moved apart to tension the assembly (carcass) 66 after it is placed over the rollers. Thereafter, a band 78 is stretched into pressure contact with the loop or assembly 66 by moving a drum 80, over which the band 78 extends, away from the roll 70. This forces the ribs of the assembly 66 fully into the forming grooves on the roll 68 to form individual V-belts. The roll 68 is driven during this time by a motor connection 71. The shafts of the rolls 68 and 70 are interconnected by a pulley and belt system (not shown). The rubber is vulcanized and the belts are separated into individual V-belts by the pressure exerted between the bands 78 and the sharp edges of the ribs 72 which form the grooves on the roll 68. This leaves the individual V-belts connected solely by the cover or jacket 64 and the fabric 20. This narrow band of fabric is mechanically severed in order to form individual V-belts, generally designated 80, as shown in FIGS. 14 and 15. Optionally, we can slit the fully molded and cured joined together V-belts into separate "groups" of V-belts, i.e., several joined together by the common backing fabric 64 and the cover fabric 20.

The fabric 20, as well as the fabric 64, may be a highly fiber-filled rubber sheet or a rubber sheet filled with a flock with a high percentage of fiber. This fabric may also be a knit fabric having high stretch in warp and fill.

The grooved roller 18, shown in FIG. 1, forms trapezoidal-shaped ribs as for V-belts, but ribs which are modified from this trapezoidal shape, may be formed by providing upstanding elements in the grooves of roller 18 to define notches in the belt as the loop 24 is formed with the rollers 16 and 18. In this way, so-called variable speed V-belts or Timing® belts can be formed which have regular notches in the trapezoidal configuration which extend down to the tension cord or substantially into the bottom rubber of the belt. Also, the grooves may be made substantially vertical to provide a straight rib geometry.

The loop 30, as shown in FIG. 5, is formed with the ribs oriented inwardly in order to facilitate the application of the tension cords 52 and the fabric 56 to the exterior surface. It is conceivable, however, that the grooves can be oriented to the exterior in the formation of a carcass at this portion of the method step.

The tension cord 52, which is applied as indicated in FIG. 6, may be a continuous winding or it could be a whole wrapping, for example, of a series of parallel cords which run in the warp direction with fill cords having little or no strength and serving merely to hold the parallel cords in alignment. Two or more windings of this nature, for example, would provide sufficient strength. In addition, the cord 52 may be wound either as a continuous helical winding or may be applied in separate loops.

The fabric 20 can be coated with a vulcanizable rubber or can be a fibrous material alone, or a vulcanizable material alone, if so desired.

In severing the covering material 56 and tension cord 52, as described in conjunction with FIG. 10, the rubber 10 may be cut into, either slightly or completely, depending upon the type of belt being made. In some instances, even fabric 20 may be cut, and an additional layer of fabric placed over it.

Many variations and modifications are possible, and depend to a large extent upon the type of belt being made. The present description as regards V-belts was meant to be merely exemplary in nature. The scope and breadth of the invention should not be so specifically interpreted, but rather should be viewed as presented in the appended claims.

Having thus described our invention, what we claim and desire to protect by Letters Patent is:

1. A method of manufacturing a plurality of belts which comprises feeding a sheet of unvulcanized but vulcanizable rubber stock and a sheet of cover material having high extensibility in both the warp and the fill directions into the nip of a smooth roll and a roll which is provided with a plurality of spaced circumferentially extending grooves across its width, each of said grooves corresponding in profile to the profile of ribs to be imparted to one face of the final belts and said sheet of cover material being adjacent said grooved roll, and thereby forming a composite laminate of said rubber stock and said cover material, said rubber stock having on the cover material side a ribbed configuration corresponding to that desired in the final belts and a smooth surface on the opposite side, said cover material conforming to and being in full contact with the ribbed configuration of said rubber stock, cutting said composite laminate into individual lengths corresponding in length to the circumferential length of the final belts, bringing the cut ends of an individual length of the composite laminate together to form an endless belt carcass in which the ribbed surface faces inwardly, placing said carcass over a pair of cooperating spaced apart rolls having matching spaced circumferentially extending grooves across their widths, said last-named grooves corresponding to the ribs on the inward face of said carcass, driving said carcass around said last-named rolls while (1) helically applying to the exterior face of said carcass reinforcing tension cord of low extensibility, (2) thereafter applying a layer of backing fabric coated with vulcanizable rubber stock over the helically applied tension cord, (3) thereafter slitting the resulting carcass assembly from the outside inwardly along lines spaced so as to coincide with the apices of rib grooves therein in such a manner as to cut through at least into the rubber stock below said tension cord but not through said cover material, and (4) thereafter applying a layer of cover material on the exterior of the resulting carcass assembly to facilitate subsequent handling thereof, subjecting the resulting carcass assembly to pressure-forming and vulcanization, and thereafter severing the cured carcass assembly along rib grooves therein to form a plurality of individual belts.

2. The method of claim 1 wherein said final belts are V-belts.

3. The method of claim 1 wherein said final belts are V-belts and wherein said pressure-forming and vulcanization are carried out by transferring the last-named carcass assembly from said last-named pair of rolls to a pair of cooperating spaced apart rolls having circumferential grooves around the surfaces thereof at laterally spaced locations which are interrupted by projecting members which extend to the tops of the V grooves between the ribs on the ribbed inward face of said carcass assembly during the curing process, moving said last-named rolls apart to tension said carcass assembly, applying pressure of a surrounding band against said carcass assembly while said assembly is pressed against one of said last-named rolls and while driving said carcass assembly around said last-named rolls and while vulcanizing the rubber stocks in said carcass assembly.

References Cited

UNITED STATES PATENTS

| 3,565,984 | 2/1971 | Sauer | 264—160 |
| 3,290,195 | 12/1966 | Davis | 156—139 |
| 2,669,280 | 2/1954 | Augustin | 156—140 |

FOREIGN PATENTS

| 416,354 | 9/1934 | Great Britain | 156—137 |

RALPH S. KENDALL, Primary Examiner

F. FRISENDA, JR., Assistant Examiner

U.S. Cl. X.R.

156—140, 141, 201, 212